(12) United States Patent
Veness

(10) Patent No.: US 10,609,893 B2
(45) Date of Patent: Apr. 7, 2020

(54) KENNEL LATCHING MECHANISM

(71) Applicant: Doskocil Manufacturing Company, Inc., Arlington, VA (US)

(72) Inventor: David Veness, Fort Worth, TX (US)

(73) Assignee: DOSKOCIL MANUFACTURING COMPANY, INC., Arlington, TX (US)

(*) Notice: Subject to any disclaimer, the term of this patent is extended or adjusted under 35 U.S.C. 154(b) by 683 days.

(21) Appl. No.: 15/166,905

(22) Filed: May 27, 2016

(65) Prior Publication Data

US 2016/0348401 A1 Dec. 1, 2016

Related U.S. Application Data

(60) Provisional application No. 62/167,992, filed on May 29, 2015.

(51) Int. Cl.
*A01K 1/00* (2006.01)
*A01K 1/03* (2006.01)
*E05B 15/16* (2006.01)

(52) U.S. Cl.
CPC ............ *A01K 1/0035* (2013.01); *A01K 1/034* (2013.01); *E05B 2015/1692* (2013.01)

(58) Field of Classification Search
CPC ........ A01K 31/06; A01K 1/03; A01K 1/0245; A01K 1/033; A01K 1/0017; A01K 1/0236; A01K 1/034; A01K 31/08; A01K 1/031; A01K 1/032; A01K 31/07; A01K 97/11; Y10T 292/082; Y10T 292/57; Y10T 70/5761; E05C 19/06; E05B 65/0007; Y10S 292/29; Y10S 292/30; Y10S 292/31

See application file for complete search history.

(56) References Cited

U.S. PATENT DOCUMENTS

| | | | | |
|---|---|---|---|---|
| 1,361,702 A * | 12/1920 | Falls | ................... | E05B 65/0811 292/123 |
| 3,244,146 A * | 4/1966 | Kurtz | ..................... | A01K 31/02 119/481 |
| 4,679,833 A * | 7/1987 | Dueringer | ............... | E05B 65/52 292/113 |
| 5,016,926 A * | 5/1991 | Sharp | ........................ | E05C 1/04 292/42 |
| 5,499,850 A * | 3/1996 | Sharp | ................... | A01K 1/0245 292/347 |
| 5,794,994 A * | 8/1998 | Miyagawa | .............. | E05B 85/12 292/336.3 |
| 6,783,162 B1 * | 8/2004 | Harper | ................. | A01K 1/0245 292/336.3 |
| 8,210,127 B2 * | 7/2012 | Kaneda | .................... | A01K 1/03 119/481 |

(Continued)

Primary Examiner — Mark A Williams
(74) Attorney, Agent, or Firm — Global IP Counselors, LLP

(57) ABSTRACT

A latching mechanism for a kennel includes a first horizontally extending latching bar, a second horizontally extending latching bar, the second bar extending substantially parallel to the first horizontally extending latching bar, and a vertically extending handle, the handle being coupled to the first horizontally extending latching bar at a first end and being coupled to the second horizontally extending latching bar at a second end, and being configured such that when moved in the vertical direction, the handle rotates the first and second horizontally extending latching bars.

13 Claims, 10 Drawing Sheets

(56) References Cited

U.S. PATENT DOCUMENTS

| | | | |
|---|---|---|---|
| 8,870,245 B2* | 10/2014 | Johnson | E05B 63/0013 |
| | | | 292/197 |
| D721,568 S * | 1/2015 | Cantwell | D30/119 |
| 2002/0195825 A1* | 12/2002 | Yang | A01K 1/0017 |
| | | | 292/63 |
| 2009/0302617 A1* | 12/2009 | Schmid | E05B 65/10 |
| | | | 292/92 |
| 2014/0083366 A1* | 3/2014 | Veness | A01K 1/0236 |
| | | | 119/482 |
| 2017/0295748 A1* | 10/2017 | He | A01K 1/034 |

* cited by examiner

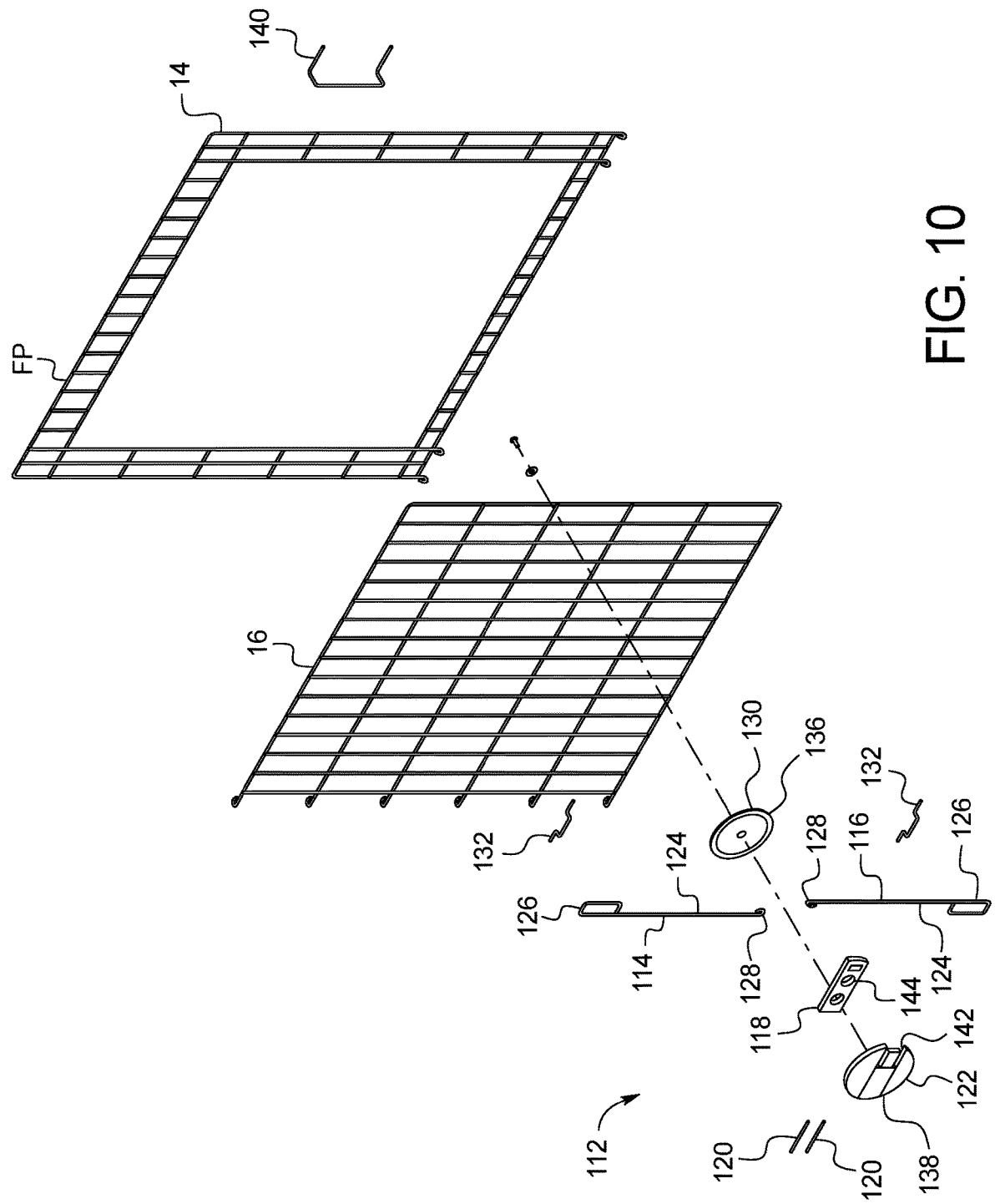

KENNEL LATCHING MECHANISM

CROSS REFERENCE TO RELATED APPLICATIONS

This application claims the benefit of U.S. Provisional Application Ser. No. 62/167,992, filed May 29, 2015, the entire contents of which are herein incorporated by reference.

BACKGROUND

Field of the Invention

The present invention generally relates to a kennel latching mechanism. More specifically, the present invention relates to a wire kennel latching mechanism that securely latches the door of a wire kennel, while providing easy access to the interior of the kennel.

Background Information

A long-standing practice exists for housing animals in kennels. In particular, portable kennels have been used to transport animals over various distances. For example, portable kennels are used to secure animals for transportation from one location to another on commercial carriers, such as airplanes, ships, and buses. Furthermore, these kennels are used to transport animals over shorter distances, such as from a home to a veterinary clinic. These portable kennels may also be used for securing an animal indoors for a short period of time.

SUMMARY

It has been found that a need exists for a latch system or mechanism that temporarily, but securely latches a kennel door closed, but is user friendly and easy to operate, without awkward manipulation of the latch.

A latching mechanism for a kennel includes a first horizontally extending latching bar, a second horizontally extending latching bar, the second bar extending substantially parallel to the first horizontally extending latching bar, and a vertically extending handle, the handle being coupled to the first horizontally extending latching bar at a first end and being coupled to the second horizontally extending latching bar at a second end, and being configured such that when moved in the vertical direction, the handle rotates the first and second horizontally extending latching bars.

In another embodiment, a latching mechanism for a kennel includes a first vertically extending latching bar, a second vertically extending latching bar, the second bar extending substantially parallel to the first horizontally extending latching bar, a latch bolt, and a handle coupled to the first vertically extending latching bar, the second vertically extending latching bar, and the latch bolt biased in a first direction by a spring, and being configured such that when rotated, the handle moves the first vertically extending latching bar and the second vertically extending latching bar.

BRIEF DESCRIPTION OF THE DRAWINGS

FIG. 10 is an exploded top perspective view of the kennel latch shown in FIG. 9.

DETAILED DESCRIPTION OF EMBODIMENTS

Selected embodiments will now be explained with reference to the drawings. It will be apparent to those skilled in the art that the present kennel latching mechanism securely latches a kennel door closed, but is user friendly and easy to operate, without awkward manipulation of the latch.

Figure 1:
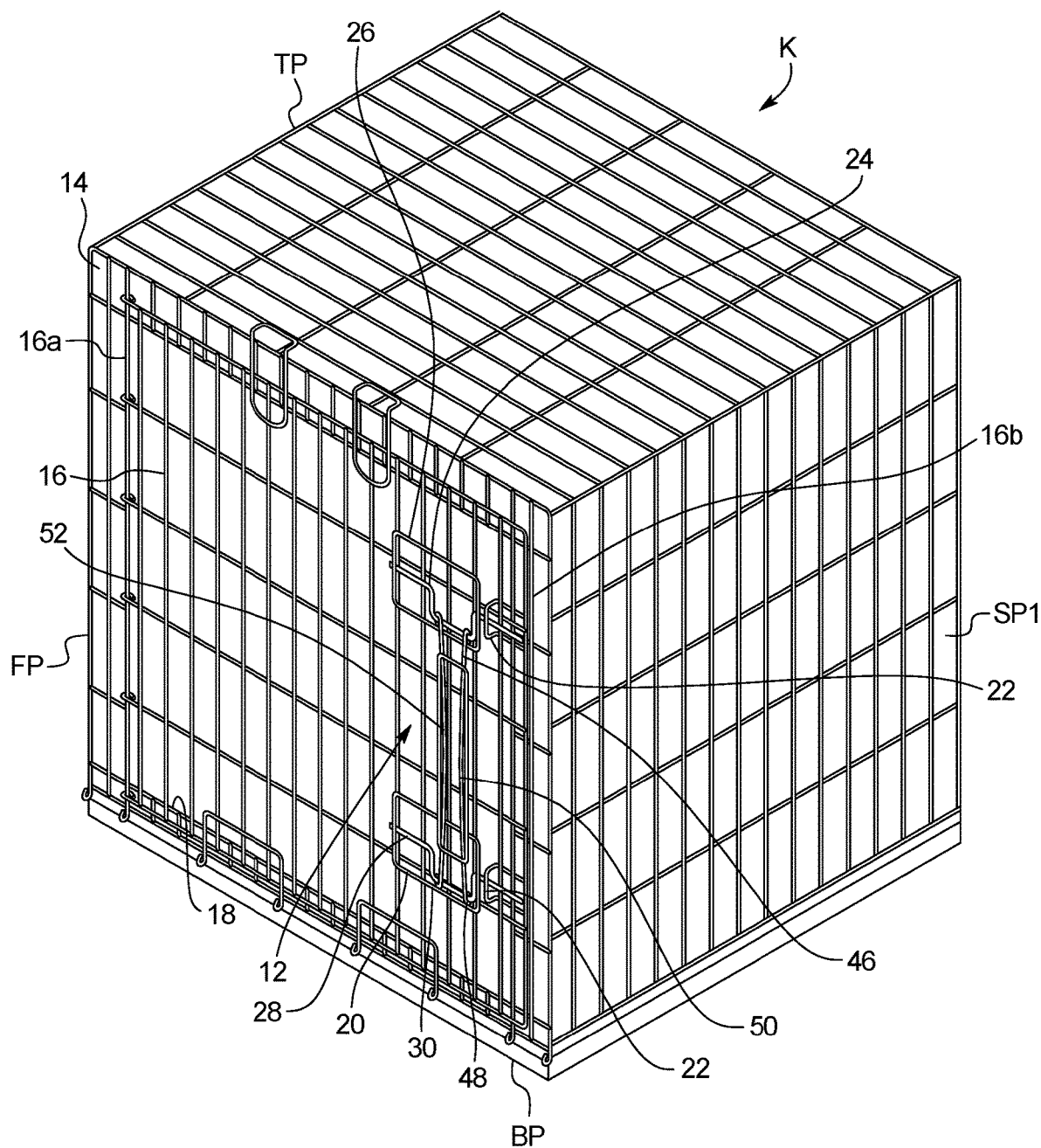
FIG. 1 illustrates a top perspective view of a first embodiment of a kennel latch according to the present invention.
Figure 2:
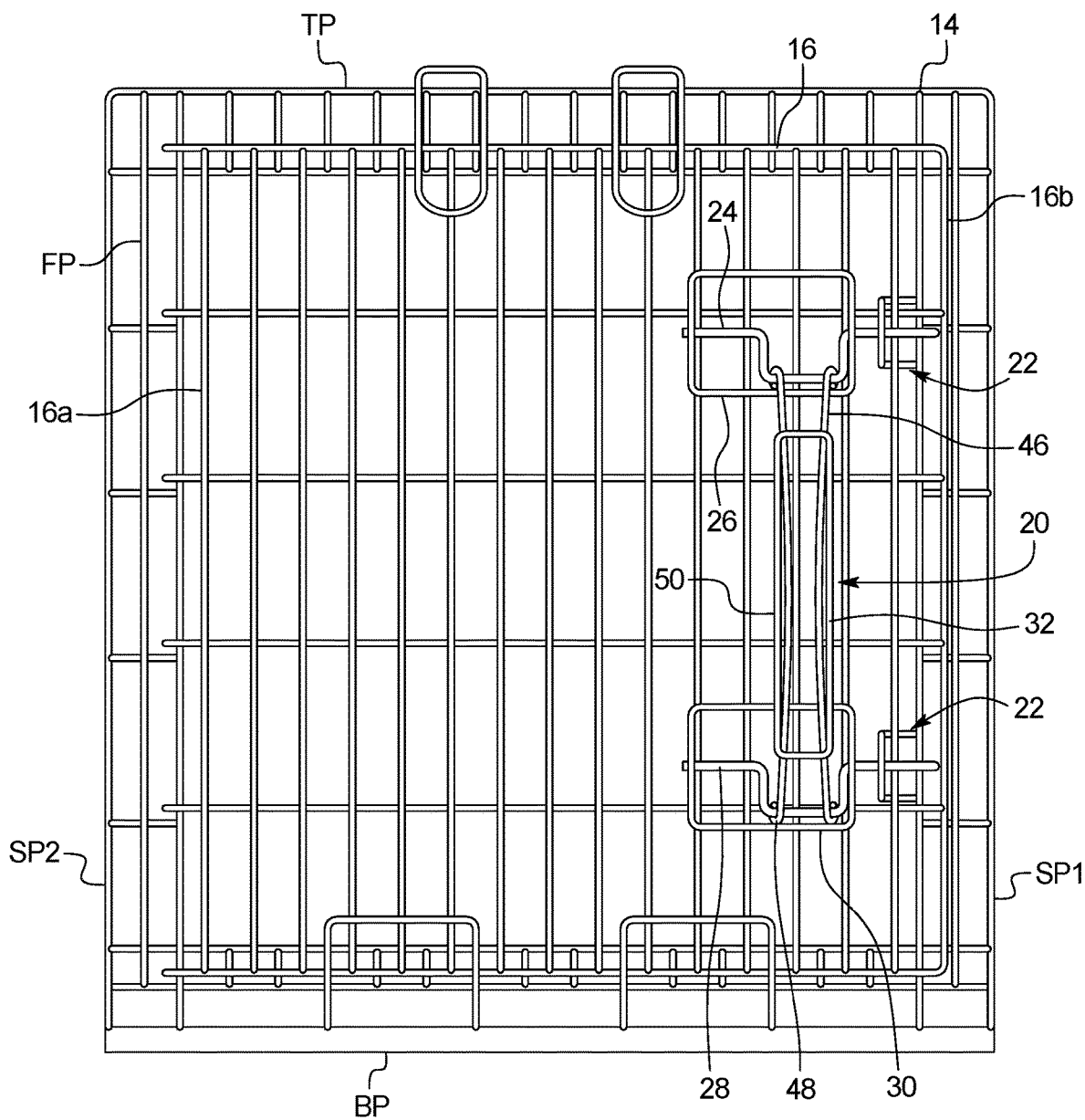
FIG. 2 is a front view of the embodiment shown in FIG. 1.

As shown in FIGS. 1 and 2, a first embodiment of the present invention is illustrated. In this embodiment, a latching mechanism 12 for a kennel K is shown. The kennel K is a generally box like structure formed from six panels. Accordingly, the kennel K includes a wire structure having a top panel TP, a bottom panel BP, a front panel FP, a back panel BP, a first side panel SP1 and a second side panel SP2. Each panel can be a separate panel that is coupled to an adjacent panel in any suitable manner. However, it is noted that the kennel K can be formed in any suitable manner.

The front panel FP includes a stationary portion 14, a door 16 and the latching mechanism 12. The stationary portion 14 includes an opening 18 sized and configured to enable an animal to pass therethrough for entry and exit of the interior portion of the kennel K. The door 16 is generally the same size as the opening 18 so as to close the opening 18, preventing the animal from passing through the opening 18. The latching mechanism 12 includes a first latching portion 20 on the door 16 and a second latching portion 22 on the stationary portion 14.

One (or a first) side 16a of the door 16 includes a hinge such that the door 16 is hinged to the stationary portion 14. The door 16 can be hinged to the stationary portion 14 in any suitable manner, such that the door 16 is capable swinging through a predetermined arc. The opposite (or a second) side 16b of the door 16 includes the first latching portion 20 of the latching mechanism 12. The first latching portion 20 is capable of coupling to the second latching portion 22 of the latching mechanism 12. The first latching portion 20 can include a first horizontally extending latching bar 24, a first coupling member 26, a second horizontally extending latching bar 28, a second coupling member 30, and a vertically extending handle 32. The second horizontally extending latching bar 28 is substantially parallel to the first horizontally extending latching bar 24.

Each of the horizontally extending latching bars 24, 28 has a first end portion 34, a second end portion 36, and a generally rectangular portion 38 disposed between the first end portion 34 and the second end portion 36. The longitudinal axis A1 of the first end portion 34 is generally parallel to the longitudinal axis A2 of the second end portion 36. In one embodiment, the longitudinal axis A1 of the first end portion 34 is along the same axis as the longitudinal axis A2 of the second end portion 36 (i.e., the first and second ends portions are coaxially). The generally rectangular portion 38 includes a first vertical part 40, a horizontal part 42 and a second vertical part 44. The first and second vertical parts 40, 44 are generally perpendicular to the first and second end portions 34, 36 and the horizontal part 42 is generally parallel to the first and second end portions 34, 36 and generally perpendicular to the first and second vertical parts 40, 44.

The vertically extending handle 32 has a first end 46, a second end 48, and a handle gripping part 50. The handle 32 includes two vertically extending bars 52, 54 that are coupled together by a rectangular member 56. The vertically extending bars 52, 54 have looped ends 58 to couple to the first and second horizontally extending latching bars 24, 28. The first end 46 of the vertically extending handle 32 is coupled to the first horizontally extending latching bar 24 at the horizontal part 42 and the second end 48 of the vertically extending handle 32 is coupled to the second horizontally extending latching bar 28 at the horizontal part 42. Accordingly, when moved in the vertical direction, the handle 32 rotates the horizontal part 42 of the first and second horizontally extending latching bars 24, 28 through a predetermined radial arc between 1 and 180 degrees.

The first and second coupling members 26, 30 couple or attach the first and second horizontally extending latching bars 24, 28 to the door 16. Each of the first and second coupling 26, 30 members includes first and second arcuate portions 60, 62 that extend around the first and second end portions 34, 36 of the horizontally extending latching bars 24, 28, respectively. Thus, the first and second coupling members 26, 30 enable a respective horizontally extending latching bar to freely rotate, but still maintain a relative position on the door 16. Additionally, the first and second coupling members 36, 30 enable the respective horizontally extending latching bar to slide along a respective longitudinal axis a predetermined distance. Preferably, the first and second arcuate portions 60, 62 are disposed a predetermined distance apart, such that as the horizontally extending latching bars 24, 28 slide along a respective longitudinal axis, one of the first and second vertical parts 40, 44 contacts a first or second arcuate portions 60, 62, prohibiting further movement along the longitudinal axis. Moreover, the first and second end portions 34, 36 are configured such that they are maintained within the first and second arcuate portions 60, 62 when the first and second vertical parts 40, 44 contact one of the first and second arcuate portions 60, 62.

Additionally, the first and second coupling members 26, 30 also can include a blocking member 64 that is configured and arranged to prevent the horizontally extending latching bars 24, 28 from moving out of the locked position. In one embodiment, the blocking member 64 is an arcuate member extending outwardly from the door 16. However, it is noted that the blocking member 64 can be any suitable and shaped device and disposed in any suitable position.

The second latching portion 22 is a generally rectangular loop (e.g., retaining mechanism) that is coupled to the stationary portion 14 of the front panel FP. The second latching portion 22 is sized and configured to receive the second end portion 36 of the first latching portion 20 when moved in a horizontal direction to securely lock the door 16.

It is noted that the components of the latching mechanism 12 and the kennel K can be any suitable material and can be connected in any suitable manner. Thus, in one embodiment, the kennel K can be a metal wire, and the first and second latching mechanism 12 can be metal connected to the kennel K in any manner desired. In one embodiment, the vertical handle 32 can be plastic or any of the components of the latching mechanism 12 and kennel K can be plastic or any suitable material.

Turning now to FIGS. 3-8, operation of the latching mechanism 12 will be discussed. Although only one latching mechanism 12 is illustrated in these figured operation of both latching members is affected simultaneously and in the same manner upon movement or operation of the vertical handle 32.

Figure 3:
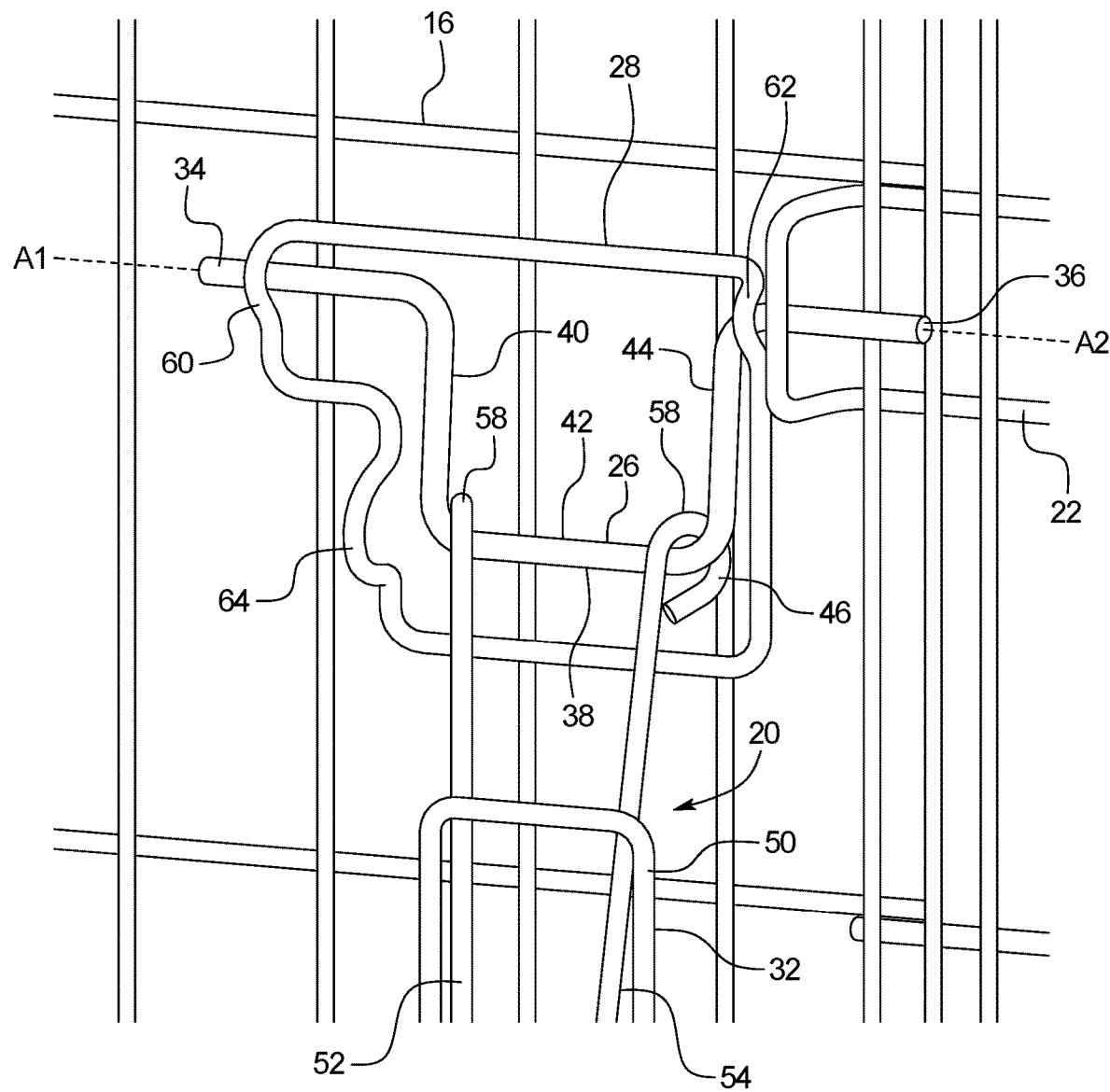
FIG. 3 is an enlarged view of a latch mechanism of the embodiment shown in FIG. 1 in a locked position.

FIG. 3 illustrates the latching mechanism 12 in a locked position. In other words, the second end portion 36 of the first latching portion 20 extends through the second latching portion 22. Thus, if a user or animal attempts to move the door 16 away from the stationary portion 14 (i.e., open the door 16), the second end will contact the blocking member 64 preventing the door 16 from being opened. Further, if the horizontally extending latching bars 24, 28 are moved in a longitudinal direction, the first vertical parts 40 will contact the blocking members 64, preventing the second end portions 36 from disengaging the second latching portion 22.

Figure 4:
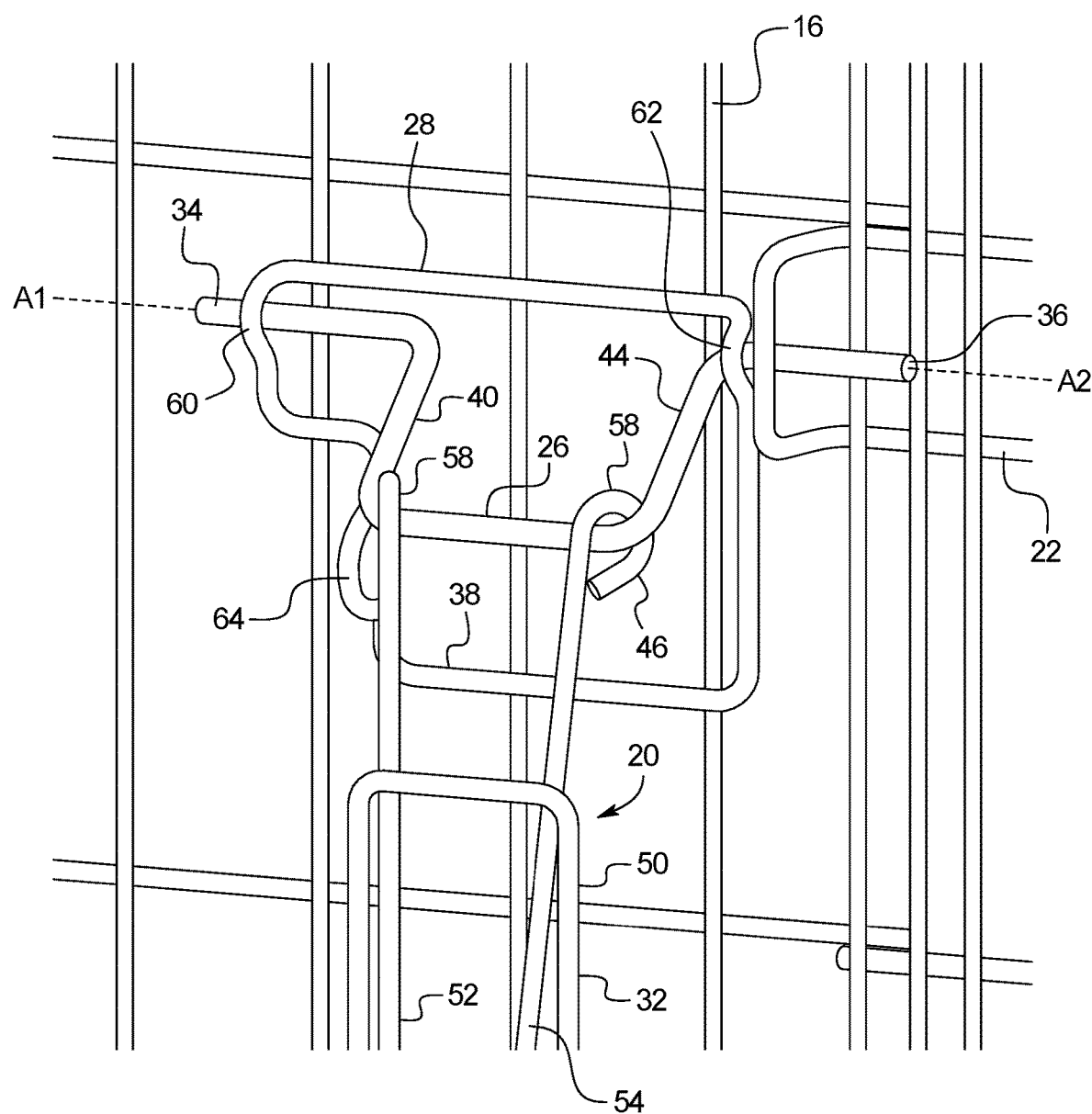
FIG. 4 illustrates the latch mechanism handle of FIG. 3 rotating from the locked position to an unlocking position.
Figure 5:
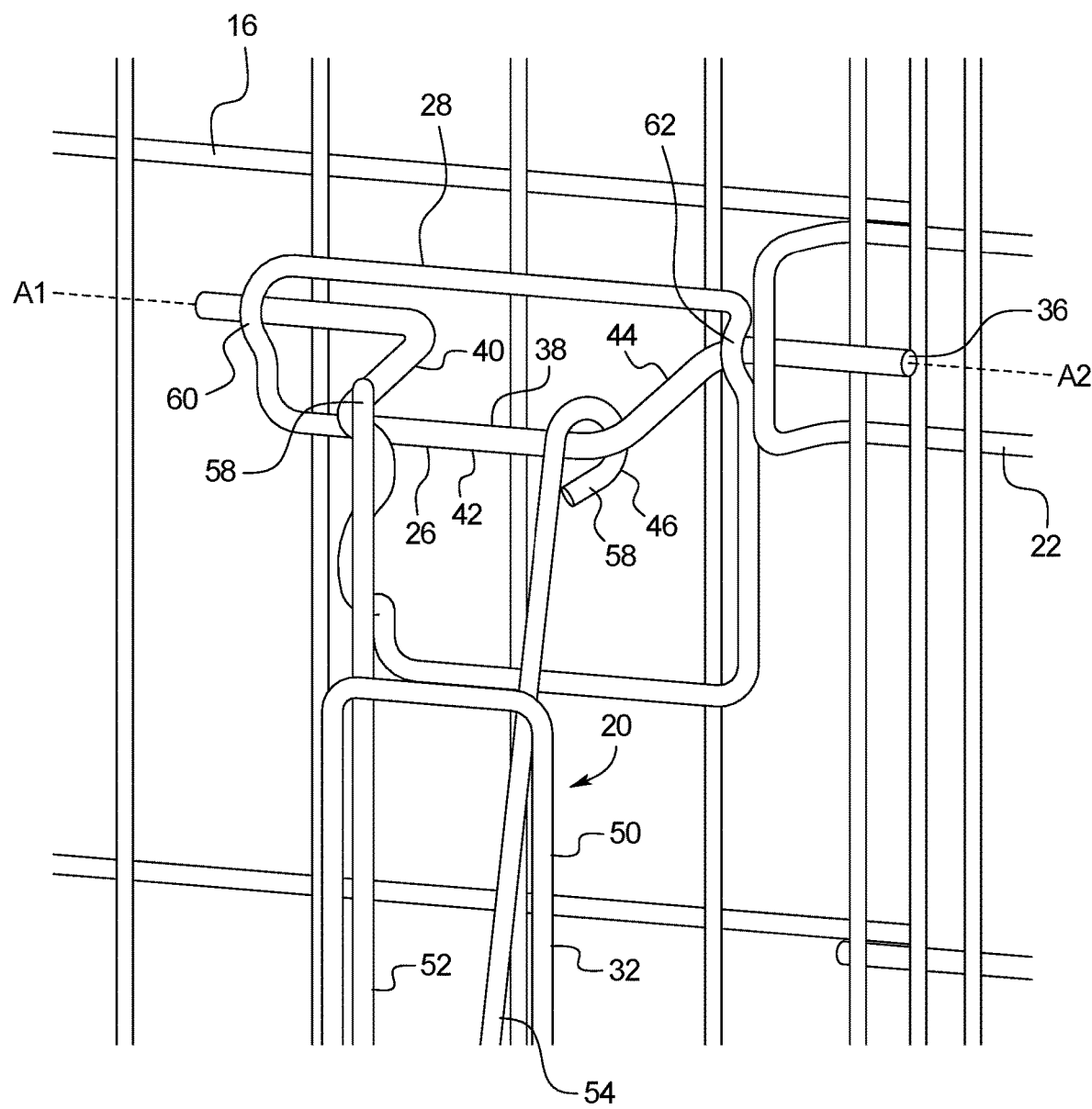
FIG. 5 illustrates the latch mechanism handle of FIG. 3 further rotating from the locked position to an unlocking position.
Figure 6:
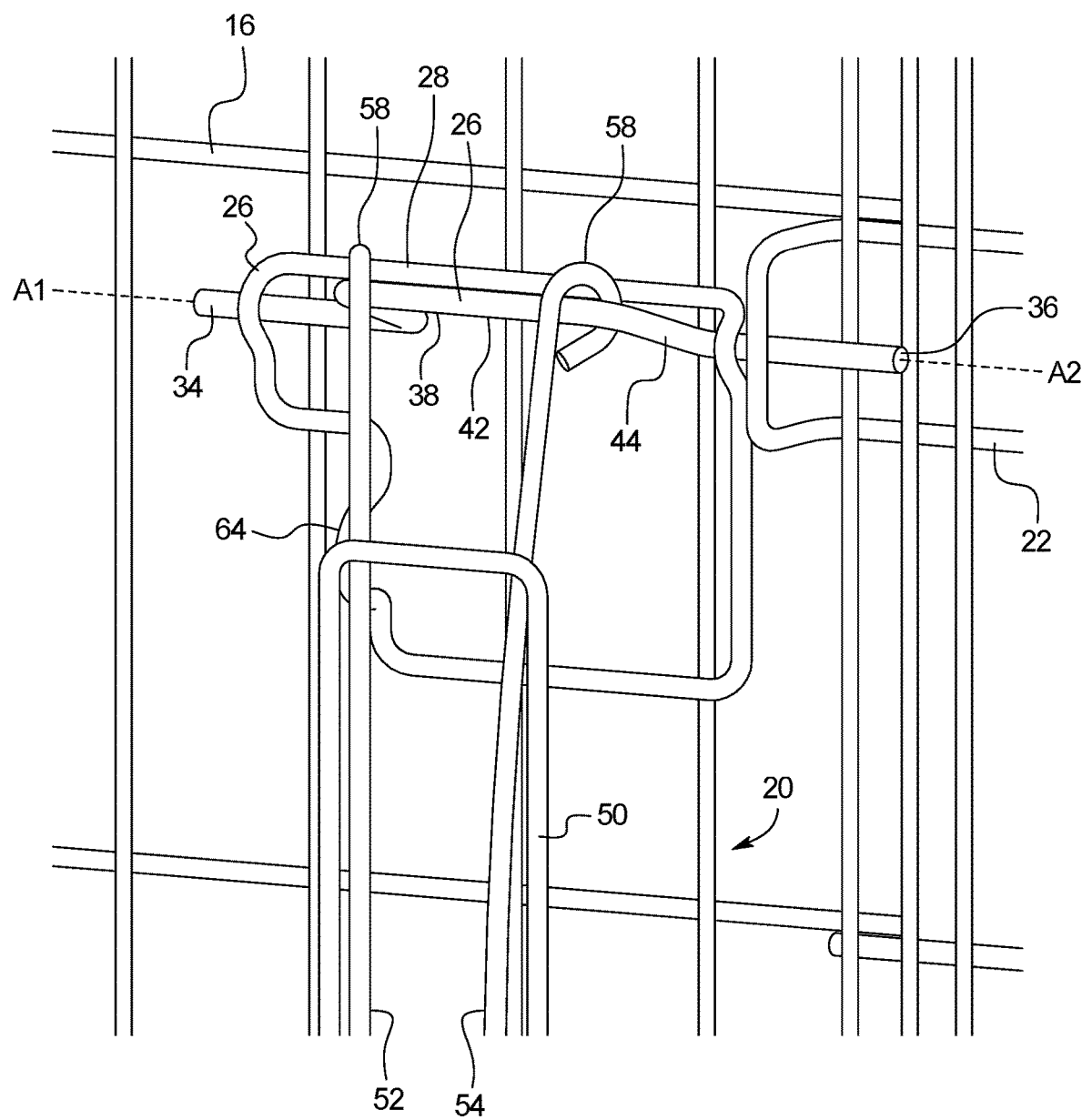
FIG. 6 illustrates the latch mechanism handle of FIG. 4 rotated into the unlocking position.
Figure 7:
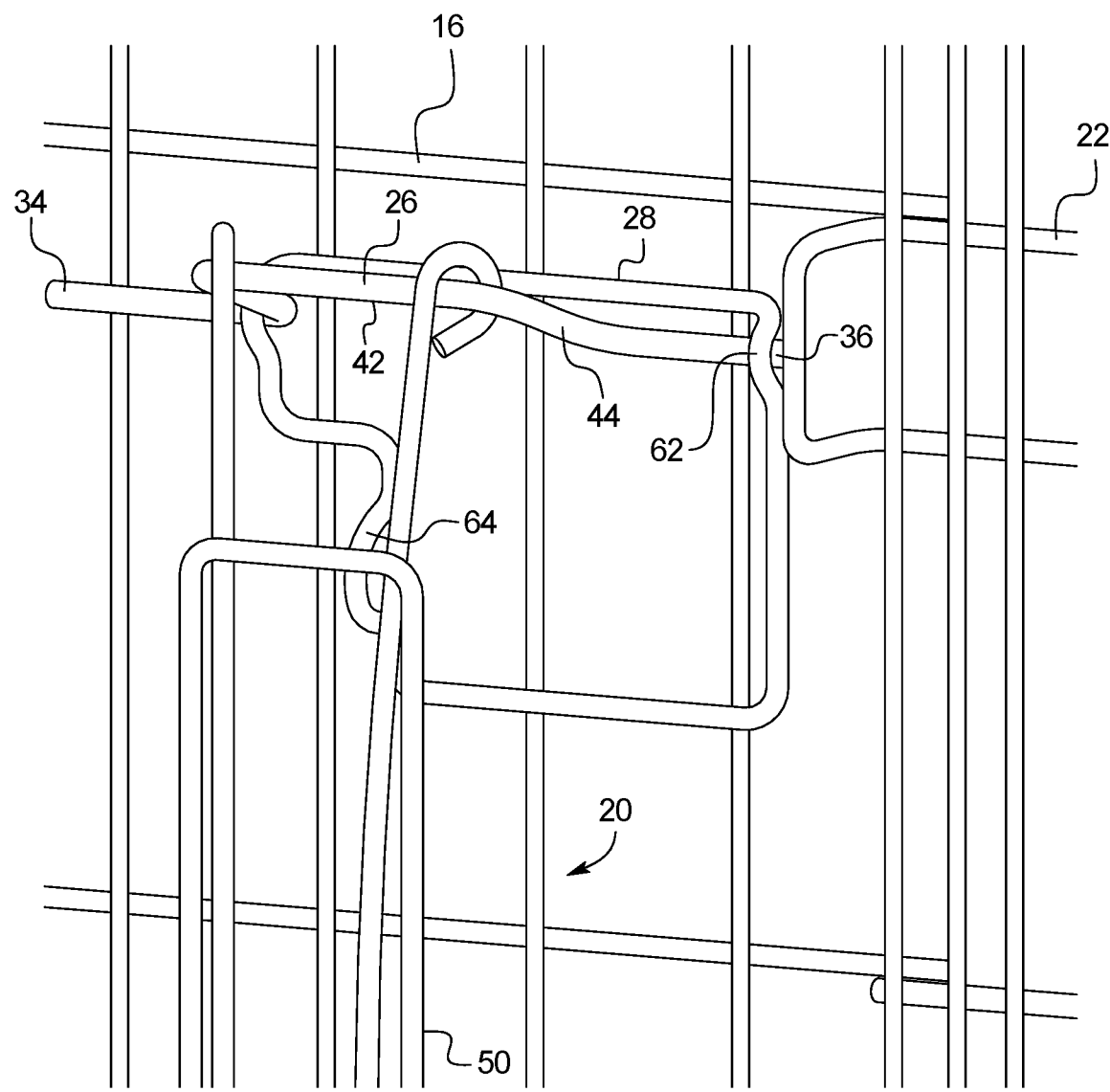
FIG. 7 illustrates the latch mechanism of the embodiment shown in FIG. 1 in an unlocked position.

In FIGS. 4-6 illustrate the rotation of the first latching portion 20 upon movement of the vertical handle 32. In particular, when an operator or a pet owner operates the vertical handle 32 by moving the handle 32 from a bottom or lower position upwardly, the ends of the vertical handle 32 rotate the horizontal part 42 through a determined arc to an unlocking position shown in FIG. 7.

Once in the unlocking position, the horizontal part 42 has been rotated so as to be positioned away from or clear of the blocking member 64. Accordingly, the first latching portion 20 can be slid in a direction away from the second latching portion 22 in a direction parallel to the longitudinal axis. The first latching portion 20 is capable of sliding a predetermined distance so as to free the second end portion 36 from the rectangular loop of the second latching portion 22. In one embodiment, the first arcuate portion 60 is positioned such that as the first latching portion 20 is moved in a horizontal direction the first vertical part contacts the first arcuate portion 60, preventing the second end portion 36 from becoming clear or free of the second arcuate portion 62. Once in this position, the locking mechanism is in the unlocked state or position and the door 16 can be opened, enabling a pet or animal to enter or exit.

Figure 8:
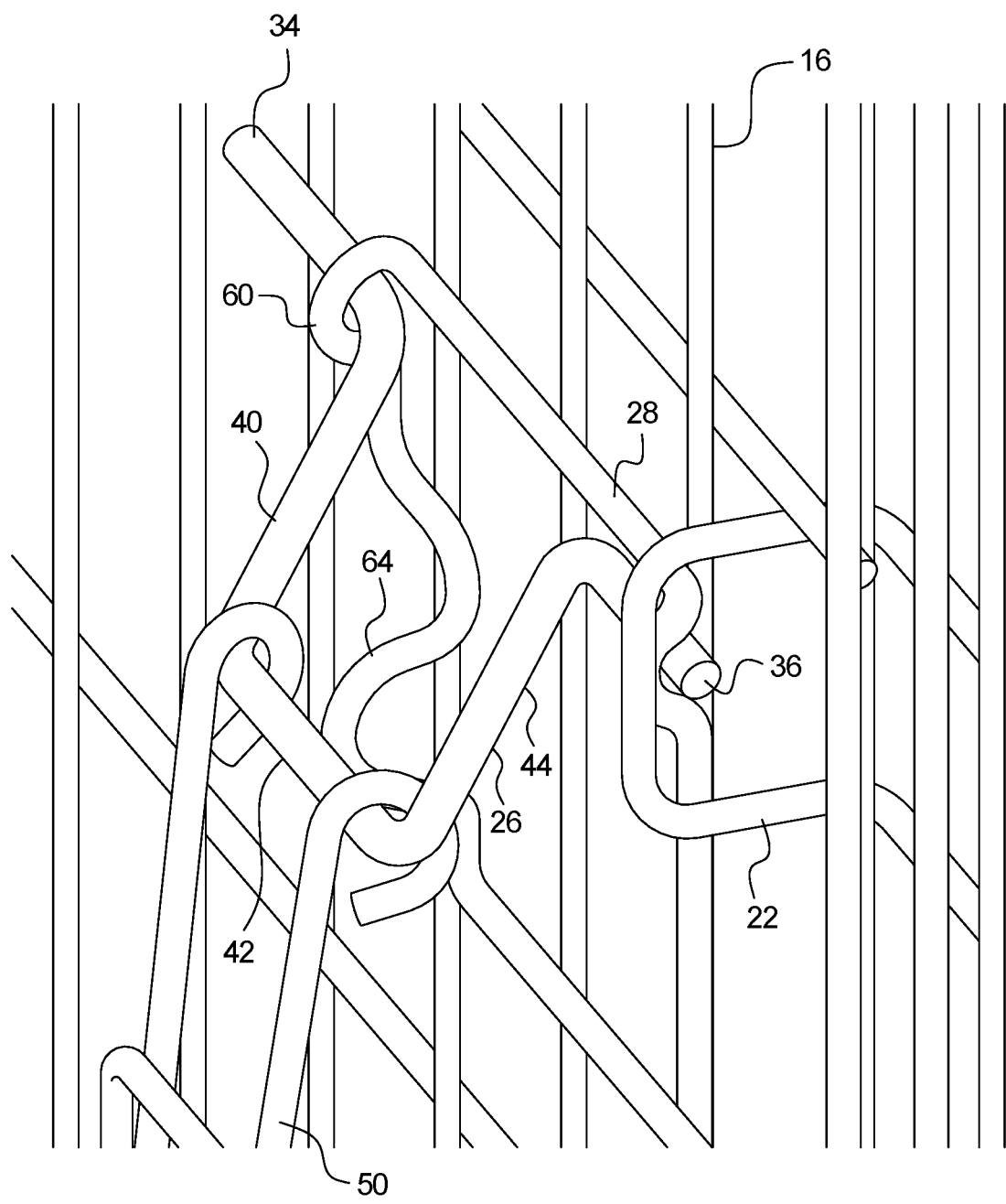
FIG. 8 illustrates the latch mechanism handle being prohibited from rotating into the locking position when the latch mechanism is in the unlocked position.

As shown in FIG. 8, in the unlocked position or state, the handle 32 cannot be rotated into the locked position. Specifically, if an operator or pet owner moves the handle in a downward direction the horizontal part 42 contacts the blocking member 64. Such a configuration prevents the handle from entering a position that appears to be the locked downward position. Accordingly, the operator or pet owner will not accidently lower the handle 32 and believe the locking mechanism 12 to be in a locked state. That is, the blocking member 64 will enable a visual indication that the locking mechanism 12 is not in a locked state.

To lock the door 16, the procedure is reversed until the door 16 is in the locked position or state. That is, the handle 32 is moved horizontally and then in a downward direction to lock the door 16 of the kennel K. In other words, moving the handle 32 in the horizontal or longitudinal direction moves the end portions 34, 36 so as to be disposed within the loop portion of the second locking portion 22, and then the handle 32 in the downward direction rotates horizontal part 42 so as to prohibit opening 18 of the door 16 and further movement of the first and second horizontally extending latching bars 24, 28 in the horizontal direction, as discussed above.

Figure 9:
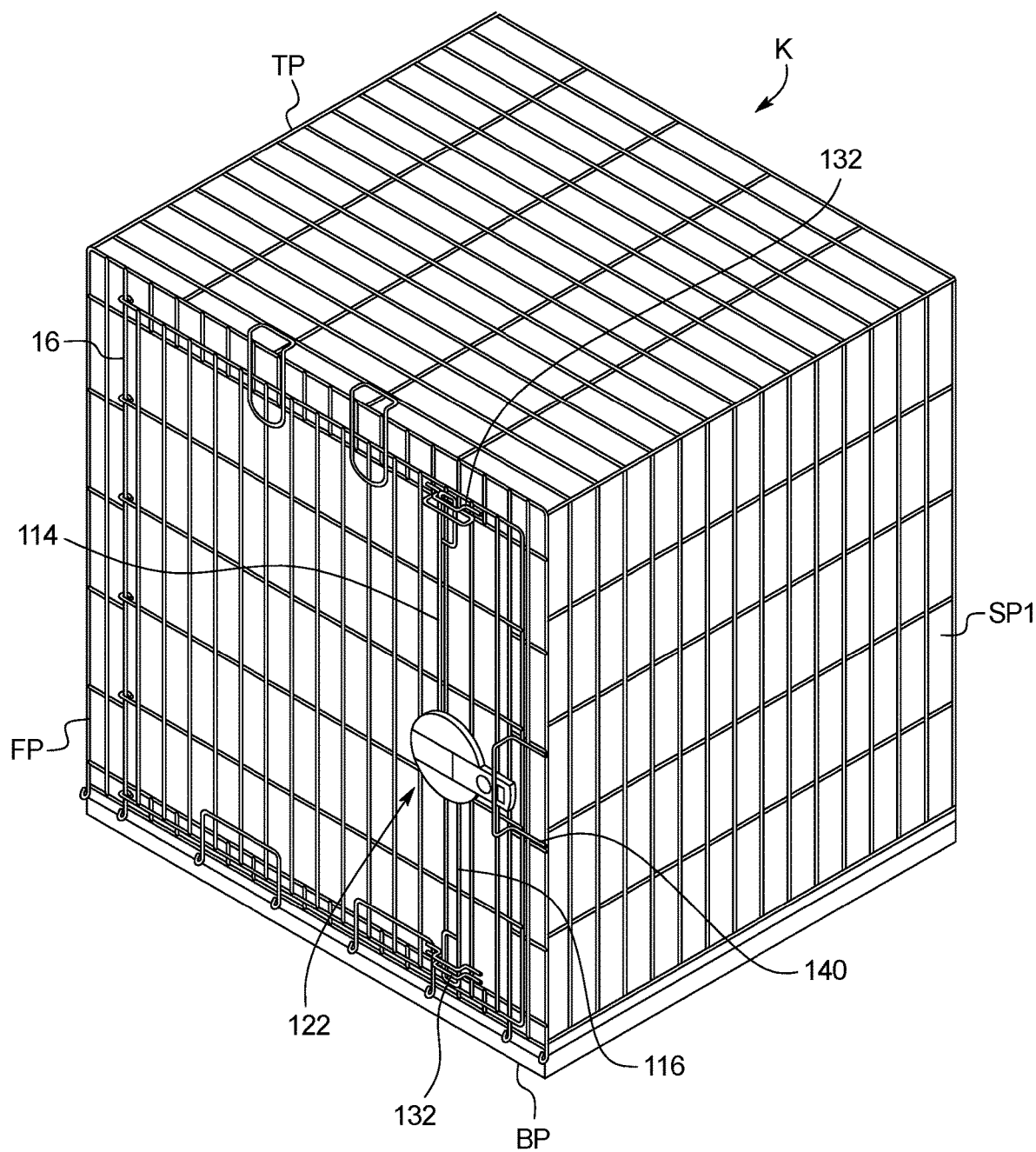
FIG. 9 illustrates a top perspective view of a second embodiment of a kennel latch according to the present invention.

FIGS. 9 and 10 illustrate a second embodiment of a latching mechanism 112 according to the present invention. In this embodiment, the kennel K is substantially similar to the kennel K described above.

This embodiment is directed to a latching mechanism 112 for a kennel K that includes a first vertically extending latching bar 114, second vertically extending latching bar 116, a latch bolt 118 biased in a first direction by a spring 120, and a handle 122. The second vertically extending latching bar 116 extends substantially parallel to the first horizontally extending latching bar 114. The handle 122 is coupled to the first vertically extending latching bar 114, the second vertically extending latching bar 116, and the latch bolt 118, and is configured such that when rotated, the handle 122 moves the first vertically extending latching bar 114 and the second vertically extending latching bar 116.

In this embodiment, the first and second vertically extending latching bars 114, 116 are substantially similar and include an elongate portion 124 and an end lock portion 126. The end 128 opposite the end lock portion 126 is attached to an outer radial portion 130 of the handle 122, or any other suitable portion of the handle 122. The first and second vertically extending latching bars 114, 116 are configured to extend through latch hooks 132 coupled to the wires of the kennel door 116 of the kennel K in a locked position. This configuration enables secure and stable locking of the kennel door 16.

Additionally, this embodiment includes a horizontally extending latch bolt 118. The latch bolt 118 is configured such that when the handle 122 is rotated, the latch bolt 118 rotates and can be retracted from the locked position in locking loop 140 to an unlocked position. Thus, the latch bolt 118 can be selectively moved such that the latching bars 114, 116 are in a locked position disposed within a respective latch hook 132, or moved to a locked position disposed outside of the latch hook 132.

The handle 122 can be generally circular and can include a latch plate 136, a latch knob 138 and at least one latch spring 120. The latch plate 136 can be metal while the latch knob 138 can be plastic; however, it is noted that the elements of the handle 122 can be any suitable material. The latch springs 120 bias the latch bolt 118 radially outwardly. The latch bolt 118 can be manually retracted in a direction opposite the force of the latch spring 120 by inserting a finger or other device through the opening 142 in the latch knob 138 and into a recess 144 in the latch bolt 118. If desired a mechanism can be included on the latch bolt and/or the latch knob to maintain the latch bolt in a retracted position.

Preferably the latch mechanisms disclosed herein are suitable for wire kennels, but can but used with any suitable animal kennel or crate.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "front", "back", "upward", "downward", "vertical", and "horizontal", as well as any other similar directional terms refer to those directions of a vehicle equipped with the kennel latching mechanism. Accordingly, these terms, as utilized to describe the present invention should be interpreted relative to a vehicle equipped with the kennel latching mechanism.

The term "configured" as used herein to describe a component, section or part of a device includes hardware and/or software that is constructed and/or programmed to carry out the desired function.

The terms of degree such as "substantially" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A latching mechanism for a kennel, the latching mechanism comprising:
   a first horizontally extending latching bar;
   a second horizontally extending latching bar, the second horizontally extending latching bar extending substantially parallel to the first horizontally extending latching bar; and
   a vertically extending handle, the handle being coupled to the first horizontally extending latching bar at a first end of the handle and being coupled to the second horizontally extending latching bar at a second end of the handle, and
   the first horizontally extending latching bar and the second horizontally extending latching bar capable of pivoting in a vertical direction into a locked state which prohibits horizontal sliding movement of the first horizontally extending latching bar and the second horizontally extending latching bar,
   the first horizontally extending latching bar and the second horizontally extending latching bar capable of pivoting in a vertical direction into an open state which enables horizontal sliding movement of the first horizontally extending latching bar and the second horizontally extending latching bar, and
   the handle configured such that when moved in the vertical direction, the handle rotates the first and second horizontally extending latching bars,
   the handle further configured to move both the first horizontally extending latching bar and the second horizontally extending latching bar between a locked state of the latching mechanism and an opened state of the latching mechanism.

2. The latching mechanism according to claim 1, further comprising a first retaining mechanism configured to receive the first horizontally extending latching bar, and a second retaining mechanism configured to receive the second horizontally extending latching bar.

3. The latching mechanism according to claim 1, wherein each of the first and second horizontally extending latching bars include a generally rectangular portion configured to prevent moving the latching mechanism into an opened state.

4. The latching mechanism according to claim 1, further comprising a blocking member configured to prevent a generally rectangular portion from moving in a longitudinal direction.

5. The latching mechanism according to claim 1, further comprising first and second coupling members configured to couple the first and second horizontally extending latching bars, respectively, to a kennel door.

6. The latching mechanism according to claim 5, wherein each of the first and second coupling members is arcuate and surrounds a portion of a respective horizontally extending latching bar.

7. The latching mechanism according to claim 1, wherein each of the first and second horizontally extending latching bars are configured to rotate though a predetermined arc from a locked position to an unlocking position.

8. The latching mechanism according to claim 7, wherein the predetermined arc of the first horizontally extending latching bar is substantially the same as the predetermined arc of the second horizontally extending latching bar.

9. The latching mechanism according to claim 7, wherein each of the first and second horizontally extending latching bars is configured to move in a vertical direction from an unlocking position to an unlocked position.

10. The latching mechanism according to claim 1, wherein the vertically extending handle is plastic.

11. The latching mechanism according to claim 1, wherein each of the first and second horizontally extending latching bars includes a first end portion, a horizontal portion and a second end portion, the horizontal portion being substantially parallel to the first and second end portions.

12. The latching mechanism according to claim 11, wherein each of the first and second horizontally extending latching bars includes a vertical portion connecting the horizontal portion to the first end portion.

13. The latching mechanism according to claim 12, wherein the vertical portion is substantially perpendicular to the first end portion and the horizontal portion.

* * * * *